United States Patent
Pawlikowski et al.

(10) Patent No.: US 12,225,094 B2
(45) Date of Patent: Feb. 11, 2025

(54) SYSTEMS AND METHODS FOR STREAMING CONTENT CONTROL AND PRIVACY MANAGEMENT

(71) Applicant: VERIZON PATENT AND LICENSING INC., Basking Ridge, NJ (US)

(72) Inventors: Krzysztof Pawlikowski, Farmington, CT (US); Khurram Abbas, Novi, MI (US); Parry Cornell Booker, Sunnyvale, TX (US); Raghuram Parvataneni, Frisco, TX (US); Carl M. Knopf, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/342,929

(22) Filed: Jun. 28, 2023

(65) Prior Publication Data

US 2025/0007990 A1    Jan. 2, 2025

(51) Int. Cl.
*H04L 67/52* (2022.01)
*H04L 65/61* (2022.01)

(52) U.S. Cl.
CPC .............. *H04L 67/52* (2022.05); *H04L 65/61* (2022.05)

(58) Field of Classification Search
CPC ................................ H04L 67/52; H04L 65/61
See application file for complete search history.

(56) References Cited

U.S. PATENT DOCUMENTS

| | | | | |
|---|---|---|---|---|
| 8,572,696 | B1 * | 10/2013 | Wiacek | H04W 4/029 713/157 |
| 2008/0008179 | A1 * | 1/2008 | Chen | H04L 61/5007 370/392 |
| 2009/0235347 | A1 * | 9/2009 | Syed | H04L 63/06 726/10 |
| 2010/0122305 | A1 * | 5/2010 | Moloney | G06Q 30/00 725/54 |
| 2013/0053057 | A1 * | 2/2013 | Cansino | H04N 21/64322 455/456.1 |
| 2016/0373794 | A1 * | 12/2016 | Heitlinger | H04N 21/2541 |
| 2017/0270561 | A1 * | 9/2017 | Ao | H04L 67/02 |
| 2018/0220192 | A1 * | 8/2018 | Tirpak | H04N 21/44227 |
| 2018/0234411 | A1 * | 8/2018 | Masiero | H04L 63/0853 |
| 2018/0278658 | A1 * | 9/2018 | Word | H04L 65/612 |
| 2021/0136437 | A1 * | 5/2021 | Loh | H04N 21/6405 |
| 2021/0336931 | A1 * | 10/2021 | Lutz | H04L 12/4641 |
| 2022/0014915 | A1 * | 1/2022 | Chauhan | H04N 21/25841 |

* cited by examiner

*Primary Examiner* — Jonathan A Bui

(57) ABSTRACT

Disclosed are systems and methods for utilizing designed market access (DMA) zones in conjunction with mobile networks so as to enable secure, appropriate read/write access to streaming content. The disclosed systems and methods enable a mapping of an Internet Protocol (IP) address to a particular geolocation node of a mobile network, whereby a DMA for such node can be identified/determined. Accordingly, the DMA can be leveraged for monitoring a customer user's location respective to streaming service/media access requests.

18 Claims, 6 Drawing Sheets

SYSTEMS AND METHODS FOR STREAMING CONTENT CONTROL AND PRIVACY MANAGEMENT

BACKGROUND INFORMATION

Designed market areas (DMAs) provide geographical boundaries for content providers, which provides streaming providers control over how content can be accessed by user subscribers within such boundaries.

BRIEF DESCRIPTION OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Currently, content providers license their media offerings (e.g., forms of proprietary and/or licensed digital content) to streaming providers in accordance with specified DMAs. Streaming providers, therefore, assume the responsibility in determining if/when a customer is located in a particular DMA zone that is licensed to view particular content.

Recently, streaming providers have deployed Fixed Wireless Access (FWA) offerings from Fixed Wireless Providers (FWP) that enable streaming media services to be provided via a mobile network, such as a fifth generation (5G) network. However, such mobile networks are not designed or configured with DMA area capabilities (e.g., they are not location-based, nor geographically constricted).

For example, Internet Protocol (IP) address allocation in mobile networks is performed by the User Plane Function (UPF) in 5G networks and the Packet Gateway (PGW) in fourth generation (4G) networks, and such gateways have specific IP pools assigned to them that are tied to a specific geographic area. When a FWA customer is assigned an IP address, these allocations are performed in a geographic boundary that does not align with the geographic boundaries of DMA(s). These boundaries on a FWA network are based on the specific IP pools assigned to UPFs/PGWs in 5G/4G networks. Thus, there is no coupling between IP allocation and DMA boundaries in FWA deployment environments. As such, current FWA deployments may fall-short of providing secure, private and accurate streaming capabilities for streaming providers and their customers.

Accordingly, as discussed herein, the disclosed systems and methods provide a novel framework that enables the mapping of an IP address to a particular geolocation node of a mobile network, whereby a DMA for such node can be identified/determined and, therefore, leveraged for monitoring a customer user's location respective to streaming service/media access requests. As provided below, this can enable secure and accurate read/write access to subscribed streaming content.

Figure 1:
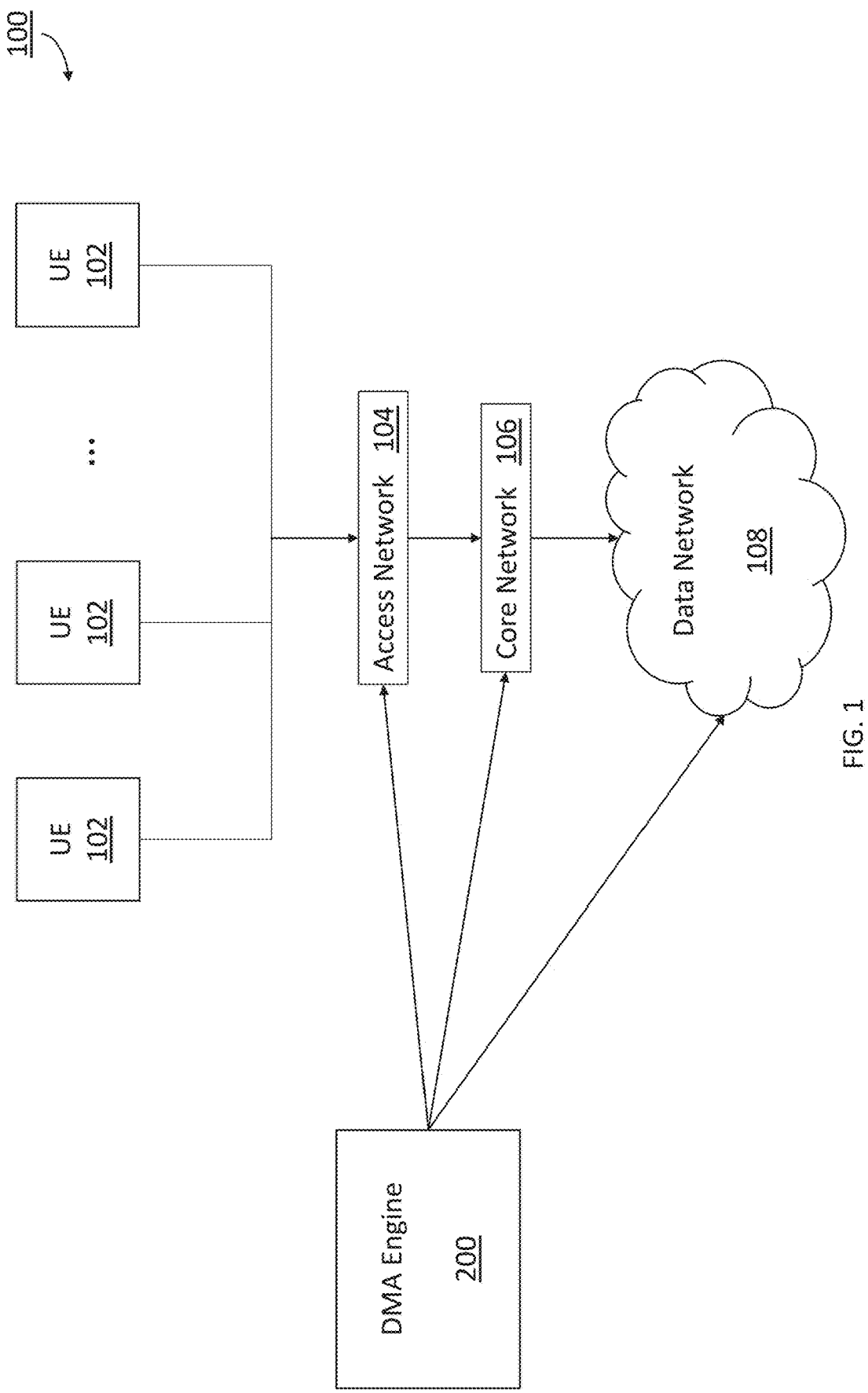
FIG. 1 is a block diagram of an example network architecture according to some embodiments of the present disclosure.

FIG. 1 is a block diagram of an example network architecture according to some embodiments of the present disclosure. In the illustrated embodiment, UE 102 accesses a data network 108 via an access network 104 and a core network 106. In the illustrated embodiment, UE 102 comprises any computing device capable of communicating with the access network 104. As examples, UE 102 may include mobile phones, tablets, laptops, sensors, Internet of Things (IoT) devices, autonomous machines, wired devices, wireless handsets, and any other devices equipped with a cellular or wireless or wired transceiver. One example of a UE is provided in FIG. 6.

In the illustrated embodiment, the access network 104 comprises a network allowing network communication with UE 102. In general, the access network 104 includes at least one base station that is communicatively coupled to the core network 106 and coupled to zero or more UE 102.

In some embodiments, the access network 104 comprises a cellular access network, for example, a 5G network. In an embodiment, the access network 104 can include a NextGen Radio Access Network (NG-RAN). In an embodiment, the access network 104 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 104 provides access to a core network 106 to the UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 106 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 106 and to external network-attached elements in a data network 108 such as the Internet.

In the illustrated embodiment, the access network 104 and the core network 106 are operated by a NO. However, in some embodiments, the networks (104, 106) may be operated by a private entity and may be closed to public traffic. For example, the components of the network 106 may be provided as a single device, and the access network 104 may comprise a small form-factor base station. In these embodiments, the operator of the device can simulate a cellular network, and UE 102 can connect to this network similar to connecting to a national or regional network.

In some embodiments, the access network 104, core network 106 and data network 108 can be configured as a multi-access edge computing (MEC) network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

FIG. 1 further includes DMA engine 200, which is configured for performing the DMA verification and content access control based therefrom, as discussed herein. DMA engine 200 can be a special purpose machine or processor, and could be hosted by or integrated into functionality associated with access network 104, core network 106 and/or data network 108, or some combination thereof. For example, DMA engine 200 can be configured to connect to and/or integrate with eNodeB and gNodeB components (of access network 104) that connect core network 106 to UE 102. In another example, DMA engine 200 can be hosted on a 5G Core—e.g., on network 106. And, in some non-limiting embodiments, DMA engine 200 can be executed via UE 102.

In some embodiments, engine 200 can be hosted by any type of network server, such as, but not limited to, an edge node or server, application server, content server, web server, and the like, or any combination thereof.

Figure 2:
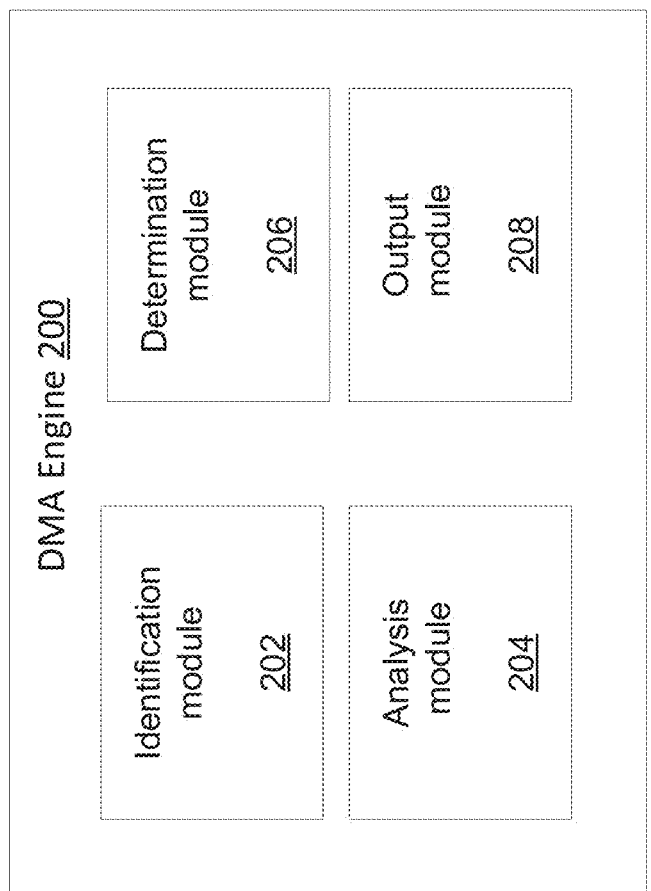
FIG. 2 is a block diagram illustrating components of an exemplary system according to some embodiments of the present disclosure.

As depicted in FIG. 2, DMA engine 200 can include, but is not limited to, identification module 202, analysis module 204, determination module 206 and output module 208. The operational capabilities and implemented functionality of each module 202-208, and engine 200 as a whole, are discussed in more detail at least in relation to FIGS. 4-5, infra.

In some embodiments, DMA engine 200 can be connected to a database or data store (not shown). The database can store information collected, processed and/or determined from the computations performed by each module 202-208. Such information can include data and metadata associated with local and/or network traffic information related to enterprises, users, UEs, services, locations, applications, content and the like.

It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3:
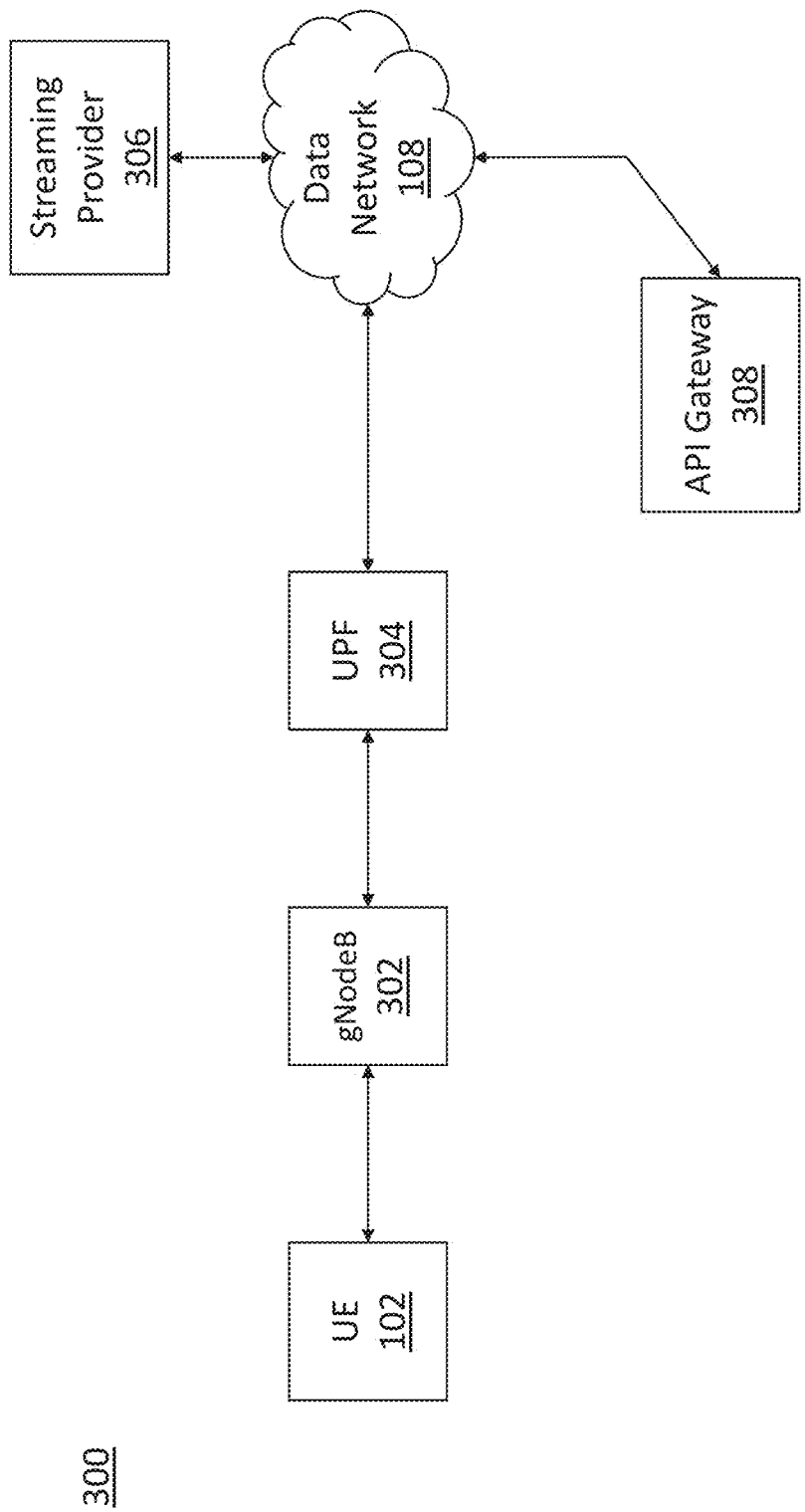
FIG. 3 is a block diagram of an example network architecture according to some embodiments of the present disclosure.

FIG. 3 provides a non-limiting example embodiment of a network configuration for implementation of the DMA framework, as discussed herein. According to some embodiments, network configuration 300 provides an example networking operating environment for the performance of Processes 400 and 500 of FIGS. 3 and 4, as discussed infra.

Depicted in FIG. 3 is UE 102, gNodeB 302, UPF 304, data network 108, streaming provider 306 and application program interface (API) gateway 308. According to some embodiments, gNodeB 302 and/or UPF 304 can reside in and/or be associated with access network 104 and/or core network 106, discussed supra. In some embodiments, API gateway 308 can reside in and/or be associated with access network 104 and/or core network 106. In some embodiments, API gateway 308 can function to host engine 200 and provide DMA management functionality between UE 102 and streaming provider 306 via data network 108.

According to some embodiments, UE 102 can request and receive streaming content from streaming provider 306. In some embodiments, gNodeB 302 (e.g., functioning as a localized cell tower for a mobile network of UE 102) can connect UE 102 to UPF 304, where UPF 304 can provide an IP address associated with the network connection of UE 102 (e.g., UE 102's connection to the data network 108). In some embodiments, API gateway 308 can generate a notification detailing that the IP address for the UE 102 is in, within and/or associated with a particular DMA based on the gNodeB 302. As discussed below, in some embodiments, streaming provider 306 can cause a verification operation related to UE 102 related to whether UE 102 is receiving appropriate/approved content in relation to their location. Such determinations/verifications are discussed in more detail below.

Figure 4:
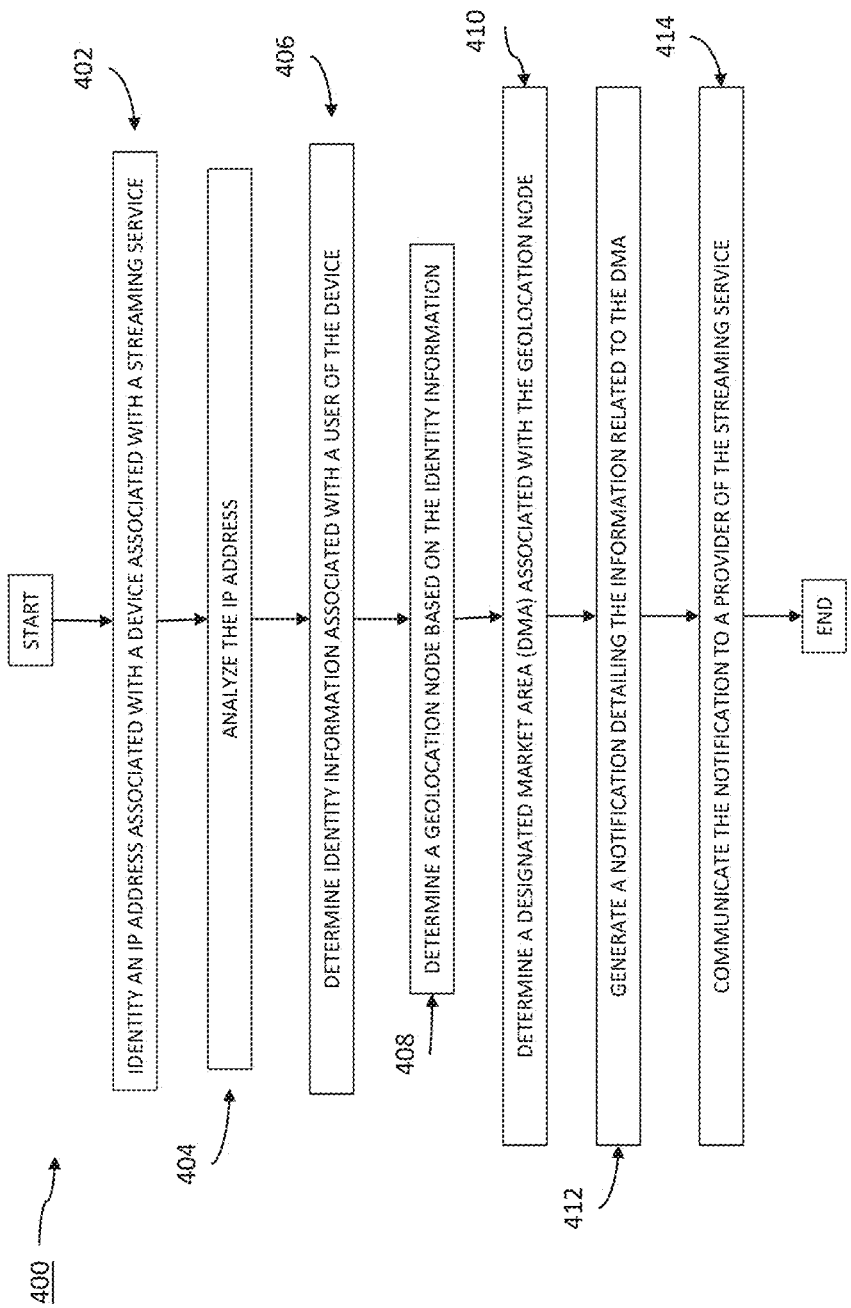
FIG. 4 illustrates an exemplary workflow according to some embodiments of the present disclosure.
Figure 5:
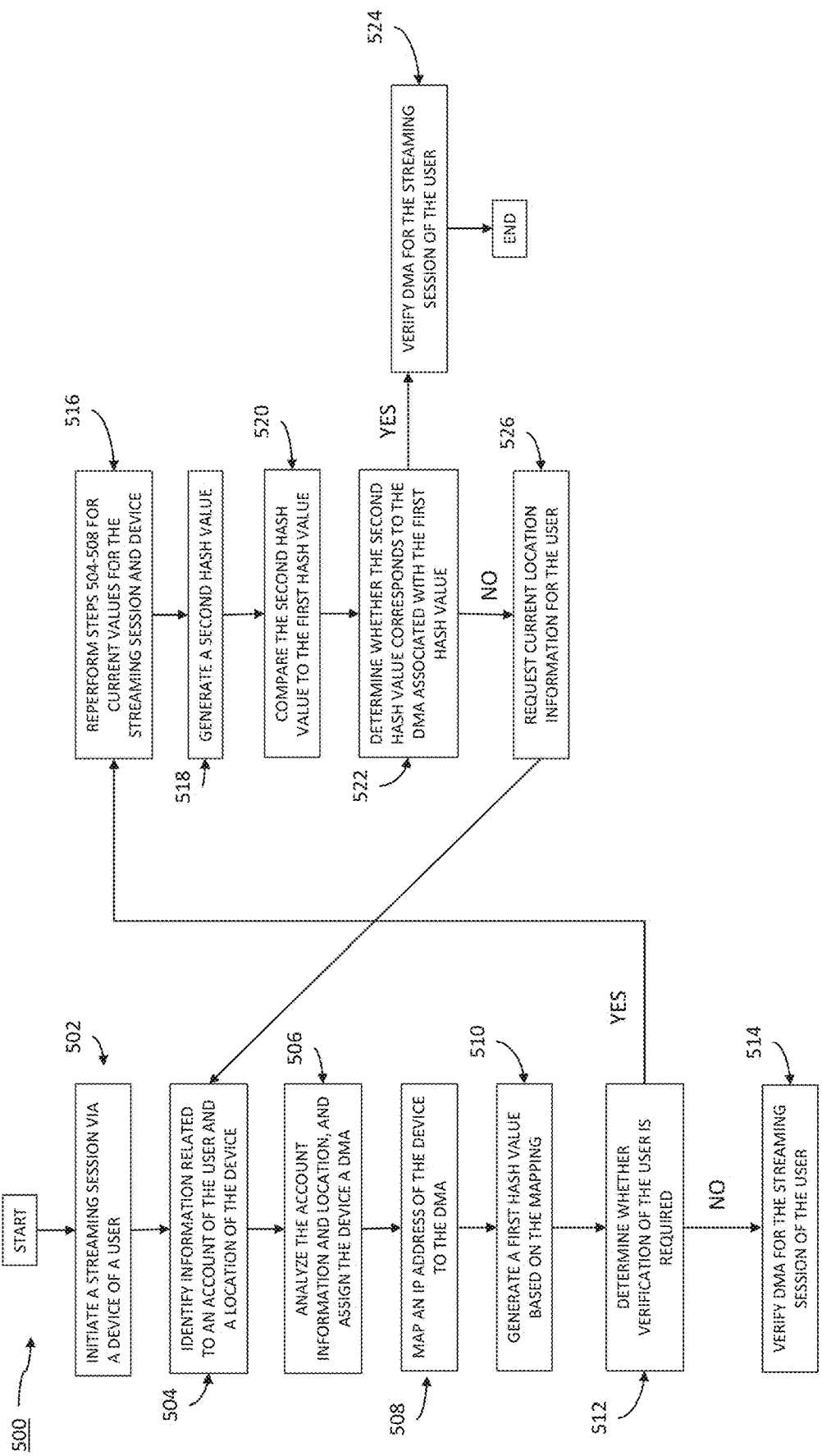
FIG. 5 depicts an exemplary workflow according to some embodiments of the present disclosure.

FIGS. 4 and 5 depict operations for the disclosed framework (e.g., via engine 200) to leverage DMAs via mobile networks. FIG. 4 provides an IP address to a DMA location service using network APIs, and FIG. 5 provides IP re-allocation DMA verification services, which entail privacy protections included therein, as discussed below.

Turning to FIG. 4, Process 400 is disclosed, where according to some embodiments, Step 402 of Process 400 can be performed by identification module 202 of DMA engine; Step 404 can be performed by analysis module 204; Steps 406-410 can be performed by determination module 206; and Steps 412-414 can be performed by output module 208.

According to some embodiments, Process 400 begins with Step 402 where engine 200 can identify an IP address associated with a device of a user. The device can be associated with a streaming service. For example, the device (e.g., UE 102) can be requesting access to and/or engaging in streaming services provided by a streaming provider (e.g., Netflix®). As discussed above, the IP address can be associated with the device's connection to a mobile network, which can be provided by and/or enabled via gNodeB 302, as discussed in relation to FIG. 3, supra.

In Step 404, engine 200 can analyze the IP address, whereby in Step 406, engine 200 can determine identity information associated with a user of the device. In some embodiments, the analysis performed in Step 404 can be performed via any type of known or to be known functionality related to the identification of IP address for purposes of determining an associated device's and/or user's identity. For example, the IP address can be tracked to the device and/or service connection, whereby a user's account can be identified from which the identity (ID) of the user can be retrieved/extracted.

In some embodiments, the ID of the user can correspond to, but not be limited to, an account of the user (on the mobile network, with the device provider and/or with the streaming provider, and the like), name of the user, username, location, device ID, and the like.

In Step 408, engine 200 can utilize the API gateway 308 to determine a geolocation node on the network. In other words, engine 200 can determine gNodeB 302 associated with the UE 102 (and the IP address from Step 402). In some embodiments, Step 408 can involve mapping the IP address to the gNodeB 302 (e.g., determining a correlation to the manner in which gNodeB is enabling the IP address access to the data network 108).

In Step 410, engine 200 can determine a DMA associated with the geolocation node (determined in step 408). According to some embodiments, engine 200 can implement functionality associated with API gateway 308, via inputs of the IP address and/or gNodeB 302 to determine a DMA. In some embodiments, the determined information related to the DMA can be a data structure that provides information related to, but not limited to, a geographic location, server or servers associated with the network, cell tower or towers related to the network, a type of network, an identify of the streaming service, account/subscription information for the user of the streaming service, and the like, or some combination thereof.

In Step 412, engine 200 can leverage the determined DMA information and generate an electronic communication. The communication, which can be configured as a notification or other type of configurable electronic message, can include information related to, but not limited to, the device ID and related information, IP address, user ID and related information, DMA information, account/subscriber information related to the streaming service, and the like, or some combination thereof.

And, in Step 414, engine 200 can cause communication of the generated notification to a streaming provider. The communication can enable the streaming provider to control how the device (e.g., UE 102) can access the digital content the streaming provider 306 is providing over data network 108. For example, the streaming provider can be provided functional control over how the content is availed to the device in accordance with how the device is positioned in relation to the DMA (e.g., either within or outside the DMA). Further discussion of how the DMA can be leveraged to confirm the device's location is discussed in detail below at least in relation to FIG. 5.

Turning to FIG. 5, Process 500 is disclosed, where according to some embodiments, Steps 502-504 and 526 can be performed by identification module 202 of DMA engine 200; Steps 506 and 520 can be performed by analysis module 204; Steps 508, 512, 516 and 522 can be performed by determination module 206; and Steps 510, 514, 518 and 524 can be performed by output module 208.

In some embodiments, Process 500 begins with Step 502 where engine 200 can identify an initiation of a streaming session via a device of a user. In some embodiments, the device can initiate a streaming session by performing such action as, but not limited to, requesting an account set up, logging into an account, downloading/installing an application, opening or instantiating an application, selecting content from a network resource, visiting a web page or portal, and the like, or some combination thereof.

In Step 504, based on the initiation of the streaming session (in Step 502), engine 200 can identify information related to the account of the user and the location of the device. In some embodiments, such user account information and location determination can be performed in a similar manner as discussed above. For example, in some embodiments, the IP address of the device can be utilized to map the user's location and determine account information for the user.

In Step 506, engine 200 can analyze the account and location information, and assign a DMA to the device based on a result of such analysis. According to some embodiments, the account information can include information about the user, such as, but not limited to, user profile information, ID, demographics, user preferences and user behaviors, settings, and the like; and the location information can indicate a precise location of the user and/or a geographic region of the user. Therefore, in some embodiments, in Step 506, engine 200 can analyze such user account and location information as inputs to a computational analysis model, whereby a DMA for the streaming session can be determined, then assigned to the device. In some embodiments, such analysis can be performed via any type of known or to be known computational analysis technique, including artificial intelligence and/or machine learning (AI/ML) models, such as, but not limited to, feature vector analysis, decision trees, boosting, support-vector machines, neural networks, nearest neighbor algorithms, Naive Bayes, bagging, random forests, logistic regression, and the like.

In Step 508, engine 200 can map the IP address of the device to the DMA, where the IP address is based on the location of the device.

In Step 510, engine 200 can generate a first hash value based on the mapping performed in Step 508. In some embodiments, the generation of a hash value can refer to a one-way mathematical function that takes the input associated with the account information and location related to the device and the subsequent generation of a fixed-size string of characters to create a unique representation of the information and location related to the device. In some embodiments, engine 200 can generate a salt value for the device based on the generated hash value. A salt value refers to a random string of characters that can be generated uniquely for a particular user and/or device, and serves as an additional security layer used in conjunction with the hashing value. For example, if two devices have identical account information and are located in the same area, their respective hash values will be different due to the unique salts. In some embodiments, engine 200 can store the first generated hash value, and related salt values, in a database (not shown), which can be associated with a streaming provider and/or network provider.

In Step 512, engine 200 can determine whether verification of the user is required. According to some embodiments, the verification may be required if the IP address and the location of the device do not align with the appropriate DMA. Thus, in Step 512, engine 200 can perform a computerized comparative analysis between the information related to the IP address and the DMA, and determine whether they correspond to the same geographic location (or geographic proximity).

In some embodiments, when the IP address and the location of the device align with the DMA, engine 200 can proceed to Step 514, where the DMA for the streaming session is verified (or confirmed as being accurate). In some embodiments, such verification can cause the generation and communication of a notification detailing the verification, which can be sent to the streaming provider, network provider and/or user, and the like, or some combination thereof.

In some embodiments, when the determination in Step 512 indicates that the IP address and DMA do not correlate to the same proximate locations (e.g., the IP address does not align with the geographic boundaries of the DMA), engine 200 can proceed to Step 516 where Steps 504-508 can be performed (e.g., engine 200 recursively calls instructions related to Steps 504-508). Thus, in Step 516, engine 200 can determine current values for the streaming session and device. In some embodiments, engine 200 can identify a modification to the IP address based on a difference in the two hash values. Thus, the values/information determined in Step 504, 506 and 508 are re-determined based on current positioning and/or IP address information of the device.

In Step 518, engine 200 can generate a second hash value. In some embodiments, the second has value can be determined based on the information determined in Step 516, which can be performed in a similar manner as discussed above at least in relation to Step 510.

In Step 520, engine 200 can perform a comparative analysis of the second hash value (from Step 518) to the first hash value (from Step 510). In Step 522, engine 200 can, based on the comparison in Step 520, determine whether the second hash value corresponds to the DMA associated with the first hash value. In some embodiments, such determination (and comparison) can be effectuated via execution of instructions associated with the API gateway 308, whereby when the hash values are the same, then their DMA correspondence location can be deemed the same).

In some embodiments, when the two hash values are determined to be the same, engine 200 can proceed to Step 522, where the DMA for the streaming session can be verified, which can be performed in a similar manner as discussed above at least in relation to Step 514. When the two hash values are determined to be different, engine 200 can proceed to Step 524, where a current location of the device (and/or user) can be requested. Upon execution of Step 526, engine 200 can recursively proceed to Step 504 for processing of the newly identified location information in a similar manner as discussed above. In some embodiments, upon executing Step 526, a notification or other type of electronic message can be compiled and communicated to the streaming provider, network provider and/or user, as discussed above, alerting such entities as to the need to update the DMA, as discussed herein.

Figure 6:
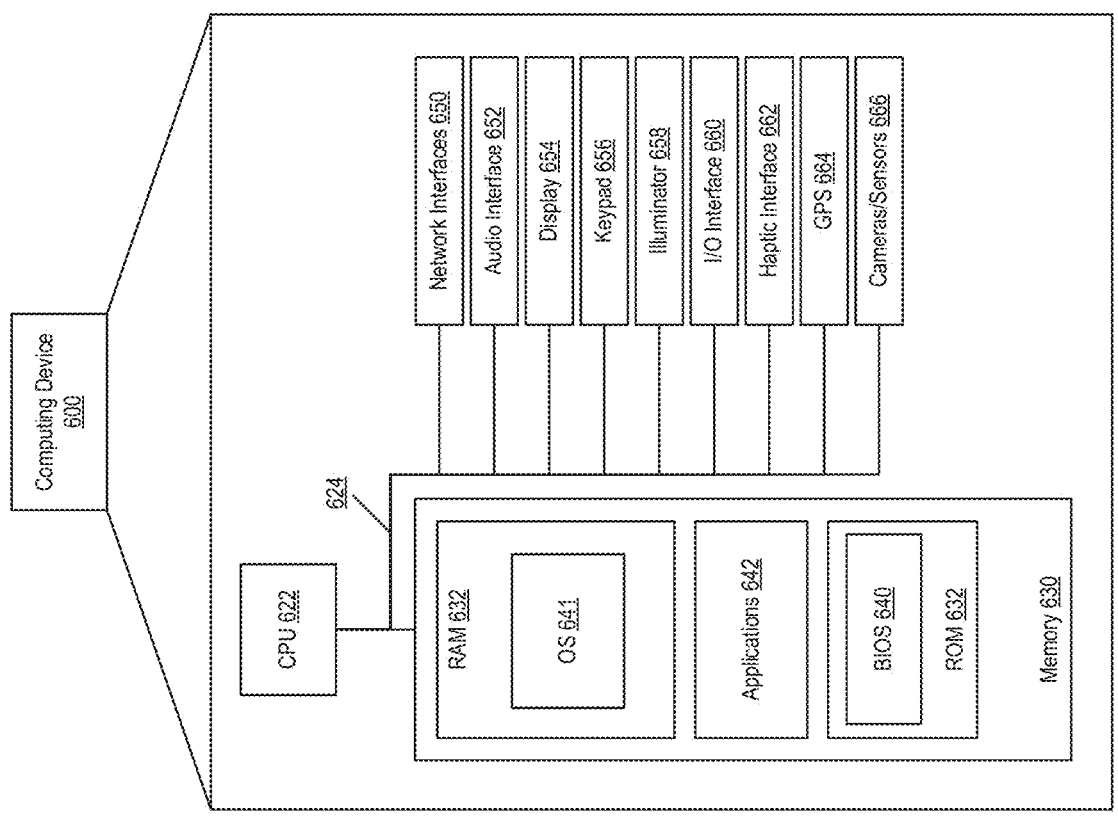
FIG. 6 depicts an exemplary implementation of an architecture according to some embodiments of the present disclosure.

FIG. 6 is a block diagram illustrating a computing device showing an example of a client or server device used in the various embodiments of the disclosure.

The computing device 600 may include more or fewer components than those shown in FIG. 6, depending on the deployment or usage of the device 600. For example, a server computing device, such as a rack-mounted server, may not include audio interfaces 652, displays 654, keypads 656, illuminators 658, haptic interfaces 662, GPS receivers 664, or cameras/sensors 666. Some devices may include additional components not shown, such as graphics processing unit (GPU) devices, cryptographic co-processors, artificial intelligence (AI) accelerators, or other peripheral devices.

As shown in FIG. 6, the device 600 includes a central processing unit (CPU) 622 in communication with a mass memory 630 via a bus 624. The computing device 600 also includes one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal, or electromagnetic sensors 666. Device 600 can include one camera/sensor 666 or a plurality of cameras/sensors 666. The positioning of the camera(s)/sensor(s) 666 on the device 600 can change per device 600 model, per device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, the bus 624 may comprise multiple busses instead of a single bus.

Mass memory 630 illustrates another example of computer storage media for the storage of information such as computer-readable instructions, data structures, program modules, or other data. Mass memory 630 stores a basic input/output system ("BIOS") 640 for controlling the low-level operation of the computing device 600. The mass memory also stores an operating system 641 for controlling the operation of the computing device 600.

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them to RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The optional GPS transceiver 664 can determine the physical coordinates of the computing device 600 on the surface of the Earth, which typically outputs a location as latitude and longitude values. GPS transceiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
   identifying, by a network device, an Internet Protocol (IP) address of a device of a user, the IP address associated with a network connection enabling a streaming session with a streaming provider;
   determining, by the network device, based on the IP address, identity information of the user and location information of the device;
   determining, by the network device, a designated market area (DMA) for the device based on the identity information and the location information, the DMA being associated with a geographic area for which content from the streaming provider is accessible;
   determining, by the network device, that the IP address for the device has changed, the changed IP address determination based on input related to a determination that the location information has changed;
   verifying, by the network device, that the streaming session corresponds to the DMA based on the changed IP address and DMA, the verification enabling the content to be accessed by the device of the user; and
   causing, by the network device, the content to be streamed to the device of the user in accordance with the verified streaming session.

2. The method of claim 1, further comprising:
   mapping the IP address to the DMA;
   generating a hash value based on the mapping; and
   storing the hash value in a data store accessible to the streaming provider.

3. The method of claim 2, wherein the verification of the streaming session is based on the hash value.

4. The method of claim 2, wherein the mapping causes the IP address and DMA to correspond to a same geographic location, the same geographic location corresponding to the location of the device.

5. The method of claim 1, further comprising:
generating another hash value based on the changed IP address; and
comparing the generated hash value to a hash value associated with the IP address, wherein the verification of the streaming session is based on the comparison.

6. The method of claim 1, further comprising:
determining a geolocation node based on the identity information; and
determining the DMA based further on the geolocation node.

7. The method of claim 1, further comprising:
communicating information related to the DMA to the streaming provider, the communication providing an indication of the streaming session in accordance with the DMA.

8. The method of claim 1, wherein the streaming session is associated with an application instance associated with the device of the user, wherein the application is associated with the streaming provider.

9. A network device comprising:
a processor configured to:
identify an Internet Protocol (IP) address of a device of a user, the IP address associated with a network connection enabling a streaming session with a streaming provider;
determine, based on the IP address, identity information of the user and location information of the device;
determine a designated market area (DMA) for the device based on the identity information and the location information, the DMA being associated with a geographic area for which content from the streaming provider is accessible;
determine that the IP address for the device has changed, the changed IP address determination based on input related to a determination that the location information has changed;
verify that the streaming session corresponds to the DMA based on the changed IP address and DMA, the verification enabling the content to be accessed by the device of the user; and
cause the content to be streamed to the device of the user in accordance with the verified streaming session.

10. The network device of claim 9, wherein the processor is further configured to:
map the IP address to the DMA;
generate a hash value based on the mapping; and
store the hash value in a data store accessible to the streaming provider, wherein the verification of the streaming session is based on the hash value.

11. The network device of claim 9, wherein the processor is further configured to:
generate another hash value based on the changed IP address;
compare the generated hash value to a hash value associated with the IP address; and
perform the verification of the streaming session based on the comparison.

12. The network device of claim 9, wherein the processor is further configured to:
determine a geolocation node based on the identity information; and
determine the DMA based further on the geolocation node.

13. The network device of claim 9, wherein the processor is further configured to:
communicate information related to the DMA to the streaming provider, the communication providing an indication of the streaming session in accordance with the DMA.

14. A non-transitory computer-readable storage medium tangibly encoded with computer-executable instructions, that when executed by a network device, perform a method comprising:
identifying, by the network device, an Internet Protocol (IP) address of a device of a user, the IP address associated with a network connection enabling a streaming session with a streaming provider;
determining, by the network device, based on the IP address, identity information of the user and location information of the device;
determining, by the network device, a designated market area (DMA) for the device based on the identity information and the location information, the DMA being associated with a geographic area for which content from the streaming provider is accessible;
determining, by the network device, that the IP address for the device has changed, the changed IP address determination based on input related to a determination that the location information has changed;
verifying, by the network device, that the streaming session corresponds to the DMA based on the changed IP address and DMA, the verification enabling the content to be accessed by the device of the user; and
causing, by the network device, the content to be streamed to the device of the user in accordance with the verified streaming session.

15. The non-transitory computer-readable storage medium of claim 14, further comprising:
mapping the IP address to the DMA;
generating a hash value based on the mapping; and
storing the hash value in a data store accessible to the streaming provider, wherein the verification of the streaming session is based on the hash value.

16. The non-transitory computer-readable storage medium of claim 14, further comprising:
generating another hash value based on the changed IP address;
comparing the generated hash value to a hash value associated with the IP address; and
performing the verification of the streaming session based on the comparison.

17. The non-transitory computer-readable storage medium of claim 14, further comprising:
determining a geolocation node based on the identify information; and
determining the DMA based further on the geolocation node.

18. The non-transitory computer-readable storage medium of claim 14, further comprising:
communicating information related to the DMA to the streaming provider, the communication providing an indication of the streaming session in accordance with the DMA.

* * * * *